Figure 1:
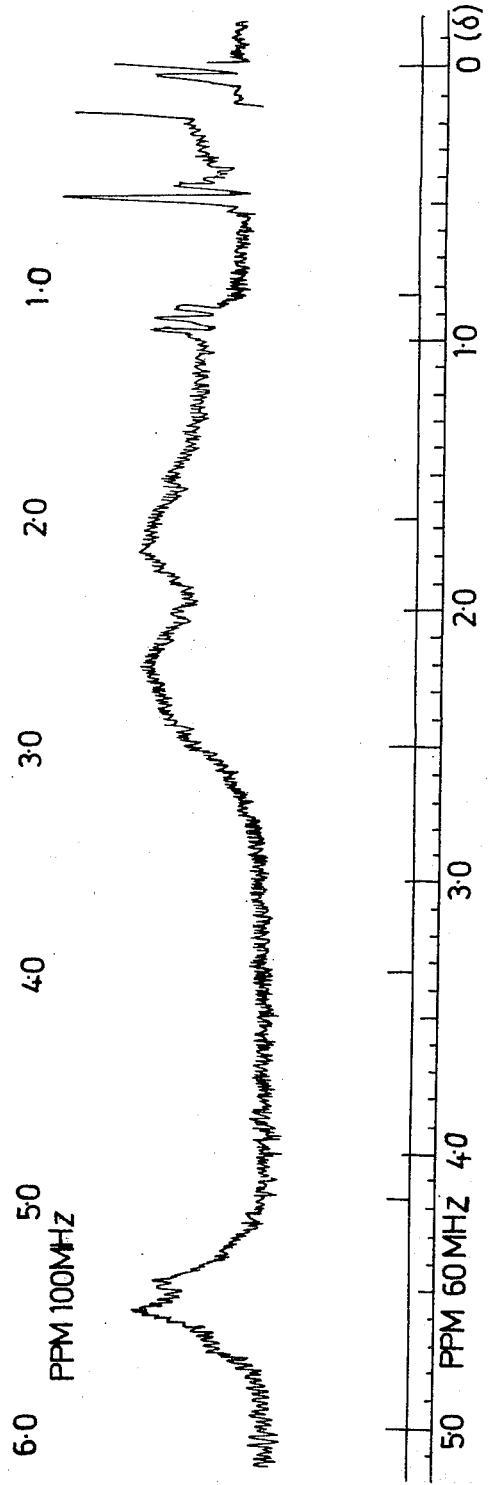

United States Patent [19]
Hepworth

[11] 3,980,626
[45] Sept. 14, 1976

[54] POLYALKENMERS FROM MONOMERS OF NORBORNENE STRUCTURE CONTAINING POLAR GROUPS

[75] Inventor: Paul Hepworth, Stockton-on-Tees, England

[73] Assignee: Imperial Chemical Industries Limited, London, England

[22] Filed: Oct. 25, 1974

[21] Appl. No.: 518,215

Related U.S. Application Data

[63] Continuation-in-part of Ser. No. 264,874, June 21, 1972, Pat. No. 3,859,265.

[30] Foreign Application Priority Data
July 2, 1971 United Kingdom............... 31123/71

[52] U.S. Cl.................... 526/297; 260/33.6 UA; 260/33.8 UA; 526/280; 526/309; 526/319
[51] Int. Cl.²................ C08F 32/08; C08F 132/08; C08F 232/08
[58] Field of Search ................. 260/85.5 A, 85.5 M, 260/85.5 HC, 88.7 R, 88.7 A, 85.5 R

[56] References Cited
UNITED STATES PATENTS

| 3,856,758 | 12/1974 | Ueshima et al. ............. 260/85.5 M |
| 3,859,263 | 1/1975 | O'Connor et al. ............... 260/80.78 |
| 3,859,265 | 1/1975 | Hepworth ...................... 260/85.5 R |
| 3,867,361 | 2/1975 | Calderon et al. .................. 260/88.2 |

*Primary Examiner*—Harry Wong, Jr.
*Attorney, Agent, or Firm*—Cushman, Darby & Cushman

[57] ABSTRACT

A novel polymer is produced by the ring opening polymerization of a 5-substituted-norbornene-2 in which the 5-substituent is a nitrile group or a nitrile group pendant that position through an alkylene radical, e.g., poly(5-cyanonorbornene-2).

5 Claims, 2 Drawing Figures

POLYALKENMERS FROM MONOMERS OF NORBORNENE STRUCTURE CONTAINING POLAR GROUPS

This invention concerns polymers of the polyalkenamer class and is a continuation-in-part of our co-pending application No. 264,874 filed June 21, 1972, now U.S. Pat. No. 3,859,265.

In particular it concerns polyalkenamers containing nitrile groups and the production of such polymers from cyclic olefinic compounds containing the norbornene structure (bicyclo[2,2,1] heptene-2). Polyalkenamers are a class of polymer produced from cyclic olefines by ring-opening of monomer molecules between doubly-bonded carbon atoms, which then separately link up with similar carbon atoms of other ring-opened monomer molecules to mutually satisfy their free valencies by forming new double bonds and hence extended molecular chains.

According to the present invention, novel polymers of the polyalkenamer class are produced by the ring-opening polymerisation of a 5-substituted-norbornene-2 in which the 5-substituent is a nitrile group or a nitrile group pendant that position through an alkylene radical, preferably methylene, and optionally with an alkyl group containing, say, 1 to 6 carbon atoms, as a co-substituent in the 5-position instead of a hydrogen atom.

Such novel polymers may be produced by bringing the substituted norbornene, optionally with a co-polymerizable cyclic olefine, especially a cyclic mono-olefine, in the liquid phase and optionally in solution in an organic solvent, for example an aromatic hydrocarbon solvent such as benzene or toluene, into contact with a polymerization catalyst comprising a tungsten, molybdenum or tantalum compound and an organo-metallic compound of Group I$a$, II$a$, II$b$ or III$a$ of the Periodic Classification.

Suitable tungsten compounds are $W^V$ and $W^{VI}$ compounds, especially the halides and oxyhalides, particularly $WCl_5$, $WCl_6$, $WOCl_4$, $WO_2Cl_2$. Suitable molybdenum compounds include molybdenum pentahalide, e.g., $MoCl_5$. Suitable tantalum compounds are $TaCl_5$ and $TaBr_5$. Preferred organo-metallic compounds are aluminum-alkyls, -alkyl hydrides and -alkyl halides of general formula $AlR_xX_y$ wherein $x + y$ equals 3, and $x$ is 1, 2 or 3 and R is lower alkyl, e.g., ethyl, isopropyl, isobutyl or n-hexyl and X (if present) is hydrogen or, preferably, halogen, e.g., chloride. As alternatives to organo-aluminum compounds, analogous Mg, Be and Za compounds may be used. The catalyst systems may, if desired, include a controlled quantity of an organic oxygen compound such as a peroxide, hydroperoxide or alcohol and where such inclusion causes liberation of hydrogen halide by elimination of halogen from a catalyst component, such hydrogen halide may be removed before catalyst use. Advantageously the proportion of organo-metallic compound incorporated in the catalyst is greater on a molar basis than the proportion of W, Mo or Ta compound, e.g., such that the Al : W (say atomic ratio is at least 2 : 1, preferably at least 4 : 1, and very satisfactorily of the order of 10 : 1.

The present disclosure includes the option to prepare the catalyst system and/or to conduct the polymerization reaction in a suitable organic solvent such as a cycloaliphatic or aromatic hydrocarbon, (e.g., benzene or toluene). The polymerization reaction is conveniently carried out at around ambient temperature but a wide range of temperatures are allowed. In practice a temperature will ordinarily be chosen in the range of from 30° to + 50°C, although when lower molecular weight products are desired the temperature is advantageously somewhat higher. e.g., 55° to 70°C. The production of lower molecular weight polymers is also encouraged by including a controlled small proportion of a chain-stopping acyclic mono-olefine, e.g., octene-1 in the reaction medium.

Norbornenyl compounds to use as monomers are conveniently preparable by addition reaction between cyclopentadiene and appropriate olefinically unsaturated compounds, e.g., vinyl compounds, alpha-alkyl vinyl compounds and allyl compounds, as described for example in U.K. patent specification No. 1,123,878.

Figure 2:
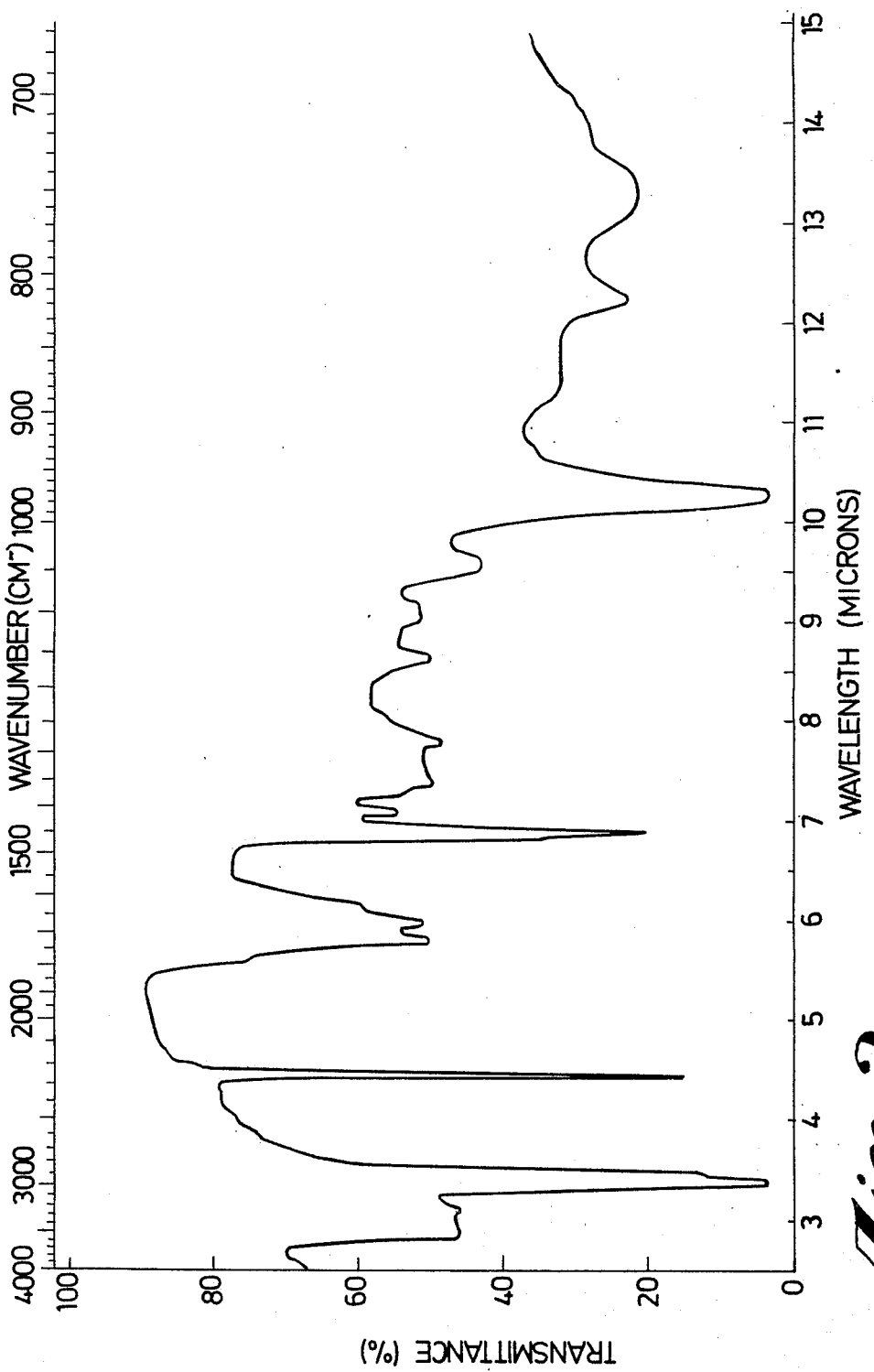

The following Examples illustrate the present invention, the novel polymers being characterized by their nuclear magnetic resonance and infra-red spectra shown, typically, at FIGS. 1 and 2.

EXAMPLE 1

Norbornenyl acetate (50 g.) was diluted with benzene (100 mls.) in a nitrogen blanketted flask. Tungsten hexachloride (5 m.moles) dissolved in benzene (100 mls.) and ethanol (5 m.moles) dissolved in benzene (50 mls.) were then added and the flask contents were purged with nitrogen to remove HCl released by reaction between the $WCl_6$ and the ethanol. Thereafter aluminum sesquichloride (50 m.moles) dissolved in solvent EC.180 (50 mls.) was added. (EC.180 is hydrogenated isobutene trimer). The ensuing polymerization reaction was allowed to proceed for 20 minutes (initial temperature 20°C, final temperature 25°C) and was then terminated by addition of 30 mls. of a mixture of Nonox WSP (1 g.), ethanolamine (3 g.), ethanol (20 g.) and benzene (100 mls.) Nonox WSP is a proprietory brand of anti-oxidant. The yield of polymer was 48 g. (96%) of molecular weight 68, 800 ± 1%. The polymer was soluble in benzene, toluene and carbon tetrachloride.

EXAMPLE 2

Norbornenyl acetate (30 g.) was dissolved in benzene (470 mls.) in a nitrogen blanketted flask. Tungsten hexachloride (1 m.mole) was dissolved in benzene (20 mls.) and ethanol (1 m.mole) dissolved in benzene (20 mls.) and ethanol (1 m.mole) dissolved in benzene (10 mls.) were then added and the flask contents were purged with nitrogen to remove HCl released by reaction between the $WCl_6$ and the ethanol. Thereafter aluminum sesquichloride (2 m.moles) dissolved in solvent EC.180 (2 mls.) was added. (EC.180 is hydrogenated isobutene trimer). The ensuing polymerization reaction was allowed to proceed for 120 minutes (initial temperature 20°C), and was then terminated by addition of 10 mls. of a mixture of Nonox WSP (1 g.), ethanolamine (3 g.), ethanol (20 g.) and benzene (100 mls.). Nonox WSP is a proprietory brand of anti-oxidant. The yield of polymer was 15.2 g. (52%). The polymer was soluble in benzene, toluene and carbon tetrachloride.

EXAMPLE 3

The procedure of Example 1 was repeated using norbornene-2, 5-carbonitrile instead of norbornenyl acetate. The polymerization reaction period was, however, 120 minutes in this case. The yield of polymer was of the order of 50%; the polymer was insoluble in benzene, toluene, carbontetrachloride and the other common solvents.

EXAMPLE 4

The procedure of Example 2 was followed using the norbornenyl compound produced by addition reaction between methylmethacrylate and cyclopentadiene, viz, the methyl ester of norbornene-2, 5-methyl, 5-carboxylic acid. The polymerization reaction period was here 45 minutes and the yield of polymer (soluble in benzene) was of the order of 73%.

EXAMPLE 5

Example 4 was repeated using the ethyl ester of norbornene-2, 5-carboxylic acid as monomer. A 76% yield of polymer, soluble in benzene and carbontetrachloride, was obtained.

EXAMPLE 6

Example 3 was repeated using norbornenyl chloride as the monomer instead of the nitrile. Again a ring-opened polymer was obtained.

EXAMPLE 7

Norbornenyl acetate (100 g.) was diluted with toluene (400 mls.) in a nitrogen blanketted flask. Tungsten hexachloride (8 m.moles) dissolved in benzene (50 mls.) were then added and the flask contents were purged with nitrogen to remove HCl released by reaction between the $WCl_6$ and the ethanol. Thereafter aluminum sesquichloride (40 m.moles) dissolved in solvent EC.180 (40 mls.) was added. (EC.180 is hydrogenated isobutene trimer). The ensuing polymerization reaction was allowed to proceed for 20 minutes at a temperature of 60°C and was then terminated by addition of 50 mls. of a mixture of Nonox WSP (1 g.), ethanolamine (3 g.), ethanol (20 g.) and benzene (100 mls.). Nonox WSP is a proprietory brand of anti-oxidant. The resultant polymer was recovered in 60% yield and had an intrinsic viscosity of 1.3.

EXAMPLE 8

Example 7 was repeated with the sole difference that the reaction mixture included octene-1 (20 m.moles). The resultant polymer has an intrinsic viscosity of 0.32, demonstrating the chain-stopping effect of the included acyclic mono-olefines.

In all of these Examples, the polymers were positively identified as being of the polyalkenamer class (i.e., ring-opened) by analytical techniques, including nuclear magnetic resonance spectroscopy.

EXAMPLE 9

Norbornene-2, 5-carbonitrile (5-cyanonorbornene-2) (50 g.) was diluted with benzene (100 mls.) in a nitrogen blanketted flask. Tungsten hexachloride (5 m.moles) dissolved in benzene (100 mls.) and ethanol (5 m.moles) dissolved in benzene (50 mls.) were then added and the flask contents were purged with nitrogen to remove HCl released by reaction between the $WCl_6$ and the ethanol. Thereafter aluminum sesquichloride (50 m.moles) dissolved in solvent EC.180 (50 mls.) was added. (EC.180 is hydrogenated isobutene trimer). The ensuing polymerization reaction was allowed to proceed for 120 minutes (initial temperature 20°C, final temperature 25°C) and was then terminated by addition of 50 mls. of a mixture of Nonox WSP (1 g.), ethanolamine (3 g.), ethanol (20 g.) and benzene (100 mls.). Nonox WSP is a proprietory brand of anti-oxidant). The yield of polymer was of the order of 50%; the polymer was insoluble in benzene, toluene, carbon tetrachloride and the other common solvents.

EXAMPLE 10

5-Cyanonorbornene-2 (4 g.) was diluted with benzene (5 mls.) in a nitrogen blanketted flask. Tungsten hexachloride (2.5 m.moles) dissolved in benzene (20 mls.), and ethanol (2.5 m.moles) dissolved in benzene (20 mls.) were then added followed by aluminum sesquichloride (5 m.moles) dissolved in solvent EC.180 (5 mls.). (EC.180 is hydrogenated isobutene trimer). The ensuing polymerizaton reaction was allowed to last for 5 minutes (initial temperature 20°C, final temperature 25°C) and was then terminated by the addition of 5 mls. of a mixture of Nonox WSP (0.1 g.) ethanolamine (0.3 g.), ethanol (2 g.) and benzene (10 mls.). (Nonox is a proprietory brand of anti-oxidant). The resultant solution was poured into an excess of isopropanol and filtered to give a 15 wt.% yield of a buff colored polymer possessing an intrinsic viscosity of 2.5 and being soluble in chloroform but insoluble in benzene. The polymer was characterized by its nuclear magnetic resonance and infra-red spectra shown in FIGS. 1 and 2 respectively.

EXAMPLE 11

Example 10 was repeated except that the time of reaction was extended from 5 minutes to 18 hours. The yield of product in this instance was 46 wt.% substantially insoluble in chloroform but possessing similar nuclear magnetic resonance and infra-red spectra to those of the product of Example 2.

I claim:

1. A polymer prepared by the ring-opening polymerization of a 5-substituted-norbornene-2 in which the 5-substituent is a nitrile group or a nitrile group pendant that is positioned through a methylene radical.

2. A polymer as claimed in claim 1 in which the 5-position of the norbornene is also substituted by a $C_1$ to $C_6$ alkyl group.

3. A polymer as claimed in claim 1 in which the 5-substituted norbornene-2 is 5-cyanonorbornene-2.

4. A polymer of a 5-substituted-norbornene-2 according to claim 1 having a nuclear magnetic resonance spectra as shown in FIG. 1 and infra-red spectra as shown in FIG. 2.

5. A polymer as claimed in claim 1 wherein the polymer contains units of a cyclic mono-olefine comonomer.

* * * * *